United States Patent
Martini et al.

(10) Patent No.: US 7,668,178 B2
(45) Date of Patent: Feb. 23, 2010

(54) METHODS AND APPARATUS FOR IMPLEMENTING VPN SERVICES

(75) Inventors: Luca Martini, Denver, CO (US); Keyur Patel, San Jose, CA (US); W. Mark Townsley, Nashville, TN (US)

(73) Assignee: Cisco Technology, Inc., San Jose, CA (US)

( * ) Notice: Subject to any disclaimer, the term of this patent is extended or adjusted under 35 U.S.C. 154(b) by 649 days.

(21) Appl. No.: 11/214,521

(22) Filed: Aug. 30, 2005

(65) Prior Publication Data

US 2007/0047557 A1    Mar. 1, 2007

(51) Int. Cl.
*H04L 12/28* (2006.01)
(52) U.S. Cl. .................. 370/395.53; 370/400
(58) Field of Classification Search .......... 370/389, 370/392, 395.53, 400, 401, 428, 395.3, 395.4, 370/395.32
See application file for complete search history.

(56) References Cited

U.S. PATENT DOCUMENTS

| | | | | |
|---|---|---|---|---|
| 7,366,181 | B2* | 4/2008 | Havala | 370/395.53 |
| 2003/0142674 | A1* | 7/2003 | Casey | 370/393 |
| 2004/0037279 | A1 | 2/2004 | Zelig et al. | |
| 2004/0215758 | A1 | 10/2004 | Kompella et al. | |
| 2005/0094577 | A1* | 5/2005 | Ashwood-Smith | 370/257 |

FOREIGN PATENT DOCUMENTS

WO        03/073709 A1    9/2003

OTHER PUBLICATIONS

International Searching Authority Document, Total Pages 5, Aug. 08, 2007.
Chinese Office Action dated Apr. 10, 2009, for Application No. 200680028760.7, 7 pgs.

* cited by examiner

*Primary Examiner*—Chirag G Shah
*Assistant Examiner*—Minh-Trang Nguyen
(74) *Attorney, Agent, or Firm*—Brinks Hofer Gilson & Lione (57) ABSTRACT

Implementation of a VPN service such as a VPLS (Virtual Private Local area network Service) is performed utilizing a two-stage process. A first stage of the two-stage process involves providing notification of whether a PE (Provider Edge) router in a label-switching network has VPLS capability. Notification can include broadcasting a message from a PE router to remote PE routers in the label-switching network to indicate whether the broadcasting PE router is VPLS enabled. A second stage of the two-stage process involves, based on receiving a notification that a PE router is VPLS enabled, generating a query message to discover a set of VPLS instances to which the broadcasting PE router belongs. In this way, a given PE router generating the query message can identify other PE routers in the label-switching network associated with the same VPLS for purposes of setting up the VPLS in the label-switching network.

33 Claims, 7 Drawing Sheets

METHODS AND APPARATUS FOR IMPLEMENTING VPN SERVICES

BACKGROUND

As well known, the Internet is a massive network of networks in which computers communicate with each other via use of different communication protocols. The Internet includes packet-routing devices, such as switches, routers and the like, interconnecting many computers. To support routing of information such as packets, each of the packet-routing devices typically maintains routing tables to perform routing decisions in which to forward traffic from a source computer, through the network, to a destination computer.

One way of forwarding information through a provider network over the Internet is based on MPLS (Multiprotocol Label Switching) techniques. In an MPLS-network, incoming packets are assigned a label by a so-called LER (Label Edge Router) receiving the incoming packets. The packets in the MPLS network are forwarded along a predefined Label Switch Path (LSP) defined in the MPLS network based, at least initially, on the label provided by a respective LER. At internal nodes of the MPLS-network, the packets are forwarded along a predefined LSP through so-called Label Switch Routers.

Each Label Switching Router (LSR) in an LSP between respective LERs in an MPLS-type network makes forwarding decisions based solely on a label of a corresponding packet. Depending on the circumstances, a packet may need to travel through many LSRs along a respective path between LERs of the MPLS-network. As a packet travels through a label-switching network, each LSR along an LSP strips off an existing label associated with a given packet and applies a new label to the given packet prior to forwarding to the next LSR in the LSP. The new label informs the next router in the path how to further forward the packet to a downstream node in the MPLS network eventually to a downstream LER that can properly forward the packet to a destination.

As well known, MPLS types of networks can support so-called Virtual Private Networks (VPNs). A VPN allows service providers to securely connect multiple customer sites over a common shared network. According to conventional applications, a VPN service uses virtual connections to keep a given customer's data private from other customers' data communicated through a shared network.

In addition to supporting VPNs, an MPLS network can support so-called Layer 2 MPLS VPNs known as Virtual Private Local area network Services (VPLS). Instead of connecting customer IP routers so that they can communicate over a shared IP backbone as if they were using their own private network, VPLS techniques enable a customer's LANs to be connected over a shared IP backbone as if they were connected to the same LAN segment, effectively creating a multipoint Ethernet VPN. One way to set up a VPLS is to employ a communication protocol such as BGP (Border Gateway Protocol).

SUMMARY

Conventional techniques of setting up a VPLS suffer from a number of deficiencies. For example, conventional techniques include a process in which routers in a label-switching network communicate with each other via use of BGP to set up a VPLS. In this conventional application, the discovery of VPLS VPNs is thought of as a single step process since all participating provider edge routers in the label-switching network utilize BGP to retrieve VPN membership information from all other PE routers in a respective label-switching network, regardless of whether an interrogated PE router even supports a VPN service. Unfortunately, this conventional discovery process using BGP congests the network because each router in the label-switching network must interrogate all other routers in the label-switching network to retrieve VPN provisioning information and set up a respective VPLS. Typically, only a subset of multiple PE routers in a label-switching network are associated with a respective VPLS. Consequently, an interrogating router in a label-switching network sometimes needlessly communicates with other PE routers in the label-switching network that have no association with any respective VPNs or VPLSs. In addition to network congestion, this conventional technique of manually discovering VPN membership does not scale well for larger label-switching networks.

In contradistinction to the techniques discussed above as well as additional techniques known in the prior art, embodiments discussed herein include novel techniques associated with VPLS discovery and implementation. For example, according to one embodiment, VPLS discovery is a two-stage process. A first stage of the two-stage process involves discovery or auto-discovery of a set of PE (Provider Edge) routers in the label-switching network that have VPLS capability (e.g., a PE router belonging to at least one VPLS). In one embodiment, implementation of the first stage includes using the LDP protocol and adding an L2VPN (Layer 2 VPN) attribute TLV to an FEC message. A second stage of the two-stage process involves discovery of a set of VPLS instances to which each PE router belongs. Thus, a given PE router can identify other PE routers in the label-switching network associated with the same VPLS for purposes of setting up the VPLS.

In furtherance of the discussion above, an embodiment herein includes facilitating a configuration of a label-switching network with VPN (Virtual Private Network) services. For example, a first router in a label-switching network communicates or broadcasts a message to a second router (or a set or routers) in the label-switching network. The message includes an indication that the first router is associated with a VPN service. The message need not provide specific details associated with the VPN service. That is, the message can include a setting of a single bit to indicate whether the first router generating the message is or is not associated with a particular type of VPN service. Examples of VPN services include VPLS (Virtual Private Local area network Service), VPWS (Virtual Private Wide area network Service), etc.

Via receipt of the message, the second router in the label-switching network learns that the second router has an associated VPN service. To learn more of the VPN service to which the first router belongs, the second router then originates and forwards a query to the second router. The query includes a request for information regarding the VPN service (or services) associated with the first router. The first router receives the request from the second router. In response, the first router forwards information (e.g., a list of VPNs) associated with the VPN service to the second router. Accordingly, the second router receives information from the first router indicating which VPNs are associated with the VPN service such as a VPLS, a VPWS, etc.

Base don this technique, a PE router in a label-switching network can easily learn which, if any, of other PE routers in a label-switching network are associated with any type of respective VPN services. Thereafter, if the PE router wishes to learn more about which VPN services are associated with a remote PE router (potentially because the inquiring PE router itself is associated with a VPN service), the inquiring PE router initiates further communications to retrieve a list of VPNs associated with the remote PE router. This alleviates each PE router in the label-switching network from having to blindly transmit detailed VPN provisioning information (for purposes of setting up a VPN service) to each other PE router in the label-switching network. Instead, based on notification of whether a remote PE router is "VPLS enabled" as indicated in a broadcasted message, each PE router knows which other PE routers in the label-switching network to query in order to further determine whether the inquiring PE router happens to be associated with a same VPN service as other remote PE routers in the label-switching network. For example, according to one embodiment, an inquiring PE router compares a list of VPNs retrieved from a remote PE router in the label-switching network to its own list of VPNs to identify whether there are any VPNs in common. For the common VPNs associated with both PE routers, the inquiring PE router communicates with the remote PE router to set up a respective VPN service in the label-switching network.

According to more specific embodiments herein, a PE router providing notification of whether it has any associated VPN attributes utilizes a first data field in a respective notification message to provide the indication that it has an associated virtual network service. Other data fields in the message are used to provide configuration information associated with the label-switching network. For example, according to one embodiment herein, the message generated by the PE router is a FEC (Forward Equivalency Class) message. A data field (such as a single bit) of the FEC message includes a network layer 2 VPN attribute to indicate whether the PE router is associated with any VPN services. Thus, notification portion (such as the single bit) of the message "piggybacks" a configuration message normally distributed throughout the label-switching network for other purposes.

In further embodiments, a PE router generating the notification message utilizes another data field in the message (in addition to the first data field discussed above) to provide an indication of whether there has been a change to virtual network service provisioning information associated with a given PE router generating the message. For example, according to one embodiment herein, the PE router in the label-switching network generating the message sets another data field to the same value each time the message the PE router broadcasts the message through the label-switching network. When there is a change to virtual network service provisioning information indicating, for example, addition or deletion of a VPN associated with the respective PE router, the PE router generating the message changes the data value previously stuffed into the notification message. Thus, each successive time a PE router in the label-switching network receives the message, the receiving PE router can identify whether there has been a change in the virtual network service provisioning information by comparing a value in a previous notification message to a new value in a newly received notification message.

Note that techniques herein are well suited for use in applications such as VPLS discovery and VPLS implementation in a label-switching network. However, it should be noted that configurations herein are not limited to use in such applications and thus configurations herein and deviations thereof are well suited for other applications as well.

In addition to the techniques discussed above, example embodiments herein also include a computerized device (e.g., a data communication device) configured to support the aforementioned method operations to facilitate auto-discovery and implementation of VPN services. According to such embodiments, the computerized device includes a memory system, a processor (e.g., a processing device), and an interconnect. The interconnect supports communications among the processor, and the memory system. The memory system is encoded with an application that, when executed on the processor, produces a process to support auto-discovery and implementation of VPN services as discussed herein.

Yet other embodiments of the present application disclosed herein include software programs to perform the method embodiment and operations summarized above and disclosed in detail below under the heading Detailed Description. More particularly, a computer program product (e.g., a computer-readable medium) including computer program logic encoded thereon may be executed on a computerized device to support auto-discovery and implementation of VPN services as further explained herein. The computer program logic, when executed on at least one processor with a computing system, causes the processor to perform the operations (e.g., the methods) indicated herein as embodiments of the present application. Such arrangements of the present application are typically provided as software, code and/or other data structures arranged or encoded on a computer readable storage medium such as an optical medium (e.g., CD-ROM), floppy or hard disk or other a medium such as firmware in one or more ROM or RAM or PROM chips or as an Application Specific Integrated Circuit (ASIC). The software or firmware or other such configurations can be installed onto a computerized device to cause one or more processors in the computerized device to perform the techniques explained herein.

One particular embodiment of the present application is directed to a computer program product that includes a computer readable storage medium having instructions stored thereon for supporting auto-discovery and implementation of VPN services. The instructions, when carded out by a processor of a respective first router (e.g., a computer device), cause the processor to perform the steps of: i) communicating a message to a set of routers in a label-switching network, the set of routers including a second router in the label-switching network, the message including an indication that the first router is associated with at least one virtual network service; ii) receiving a request from the second router for a list of VPNs associated with the at least one virtual network service of the first router; and iii) in response to the request from the second router, forwarding the list of VPNs associated with the at least one virtual network service of the first router to the second router. Other embodiments of the present application include software programs to perform any of the method embodiment steps and operations summarized above and disclosed in detail below.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

One embodiment herein is directed to a technique of facilitating implementation of VPN services such as VPLS, VPWS, etc. in a label-switching network. Implementation of the VPN services according to one embodiment herein includes utilization of a two-stage process.

A first stage of the two-stage process involves providing notification of whether a PE (Provider Edge) router in a label-switching network has VPLS capability. Notification can include generating and broadcasting a message from a given PE router to corresponding remote PE routers in the label-switching network to indicate whether the broadcasting PE router (e.g., the given PE router) is VPLS enabled.

A second stage of the two-stage process involves generating a query message from a PE router receiving the notification message to the broadcasting PE router that generated the message in order to discover a set of VPLS instances (e.g., VPNs) to which the broadcasting PE router belongs. In response to receiving the query message, the broadcasting PE router sends the querying PE router a list of VPNs associated with the broadcasting PE router. In this and a similar way, the PE router generating the query message can communicate with the broadcasting PE router as well as other PE routers in the label-switching network broadcasting a similar type of notification message to identify which of multiple PE routers in a label-switching network are associated with a VPLS. One purpose of learning which PE routers are associated with a VPLS is to set up a VPLS amongst the PE routers in the label-switching network.

Figure 1:
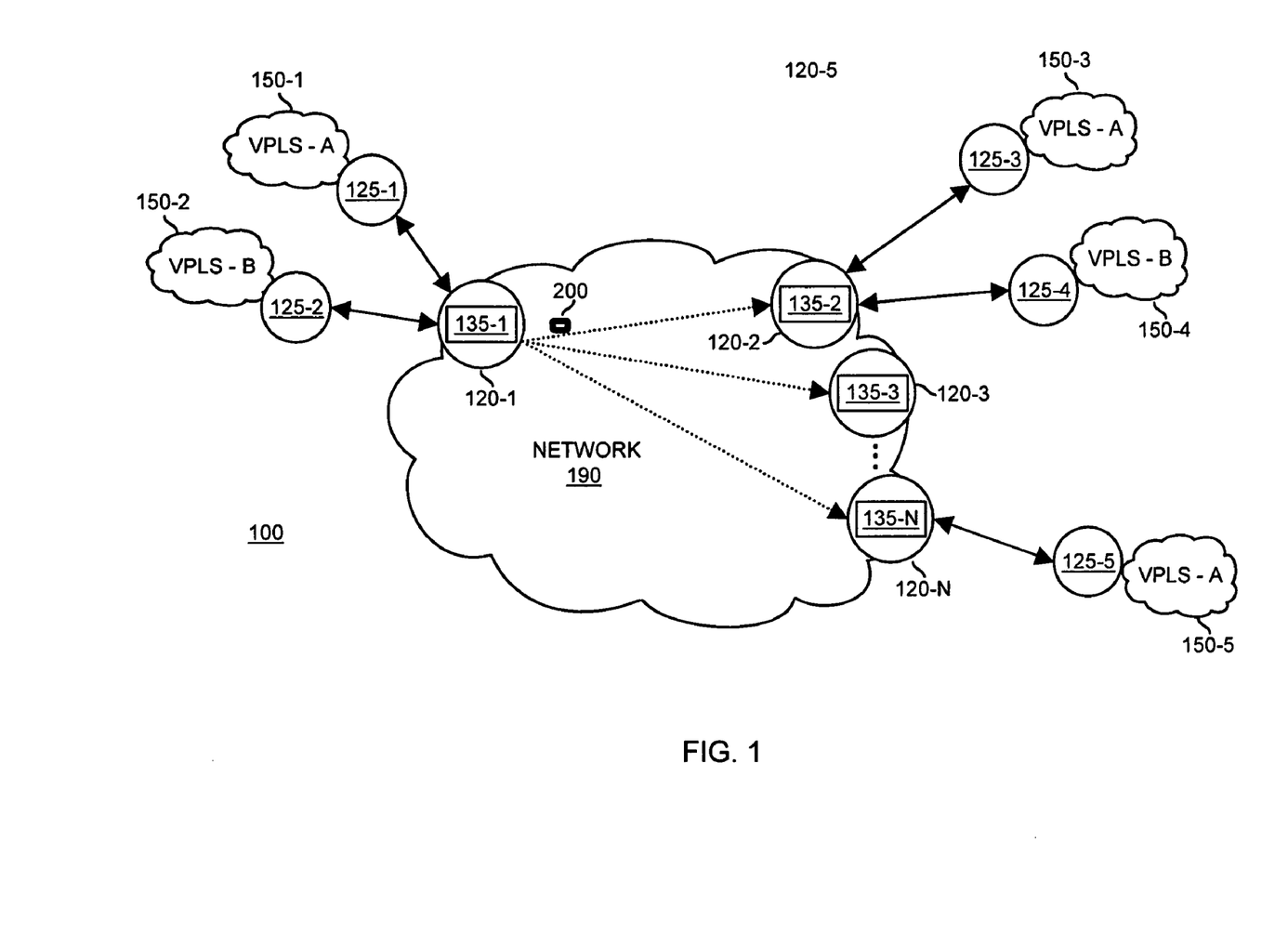
FIG. 1 is a diagram of a communication system in which data communication devices distribute notifications amongst each other according to an embodiment herein.

FIG. 1 is a block diagram of a communication system 100 in which data communication devices 120 such as PE routers communicate amongst each other to set up VPN services (e.g., a VPLS, VPWS, etc.) according to an embodiment herein.

As shown, communication system 100 includes network 190 (e.g., a label-switching network such as that based on MPLS (Multi-Protocol Label Switching) techniques). Network 190 includes data communication devices 120 (e.g., data communication device 120-1, data communication device 120-2, data communication device 120-3, . . . , and data communication device 120-N). Each data communication device 120 includes a respective configuration manager 135 (e.g., configuration manager 135-1, configuration manager 135-2, . . . , configuration manager 135-N) to distribute information whether it is associated with a VPLS. A configuration manager 135 of a respective data communication device 120 receiving the information can initiate communication with a data communication device sending the message to learn whether the routers are associated with a common VPLS.

Communication system 110 also includes networks 150 (e.g., network 150-1, network 150-2, network 150-3, . . . , and network 150-5). In one embodiment, networks 150 are local area networks (i.e., LANs) that communicate with each other through respective data communication devices 125 (e.g., a customer edge router) and network 190.

Networks 150 can be owned and operated by different clients. For example, network 150-1, network 150-3, and network 150-5 can be owned and operated by a first company. Network 150-2 and network 150-4 can be owned and operated by a second company. According to one embodiment herein, a service provider associated with network 190 implements separate VPLSs in order to connect respective LANs to each other via secure communication paths. The following discussion illustrates a technique of setting up VPLS-A to connect network 150-1, network 150-3, and network 150-5 as well as setting up VPLS-B to connect network 150-2 and network 150-4.

According to one embodiment herein, VPLS discovery is divided into a 2-stage process. A first stage of the process involves discovery of a set of data communication devices 120 such as PE routers in network 190 that have VPLS capability. Such data communication devices 120 are defined as those that are associated with at least one VPLS. As an example, data communication device 120-1 is associated with VPLS-A and VPLS-B and is therefore is VPLS-enabled. The second stage of the process involves discovery of a set of VPLS instances to which a respective data communication device 120 belongs.

Now, more specifically, the first stage of the discovery process involves broadcasting a message 200 from data communication device 120-1 to other data communication devices 120 in network 190. In the example shown in FIG. 1, data communication device 120-1 distributes (e.g., via LDP) message 200 amongst other data communication devices in order to indicate whether data communication device 120-1 is "VPLS-enabled." Other data communication devices 120 can communicate a similar type of message 200 for distribution in network 190 to other respective data communication devices 120 to indicate whether they are VPLS-enabled.

Figure 2:
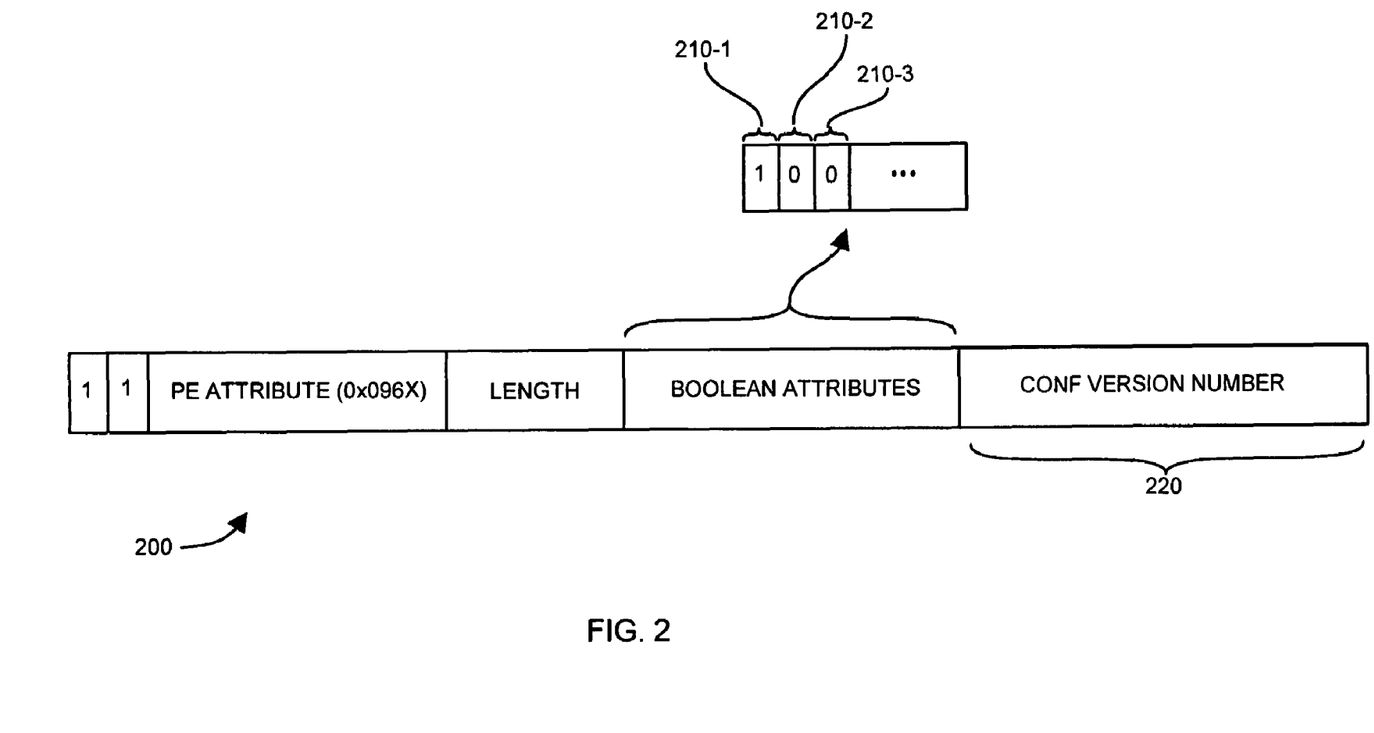
FIG. 2 is a diagram illustrating contents of a notification message distributed throughout a network to indicate whether the router sending the notification message is associated with a VPN service according to an embodiment herein.

An example of message 200 is illustrated in FIG. 2. As shown in FIG. 2, data communication device 120-1 sets bits in data fields 210 in order to indicate whether a respective data communication device sending the message 200 is associated with a VPLS, VPWS, etc. For example, a logic high in a respective data field 210 indicates that a respective data communication device 120 is part of a given VPN service while a logic lo indicates that the respective data communication device 120 is disabled from being part of a respective VPN service type.

As shown in FIG. 2, data communication device sets data field 210-1 to a logic one to indicate that data communication device 120-1 is associated with at least one VPLS or that data communication device 120-1 is VPLS-enabled. Data communication device 120-1 sets data field 210-2 to a logic 0 to indicate that it is not associated with any VPWSs. Accordingly, data communication device 120-1 generating the message 200 can utilize a data field 210-1 in the message 200 to indicate whether the data communication device 120-1 is associated with a first type of virtual private network service (e.g., a VPLS) as well as utilize a second data field 210-2 in the message 200 to indicate whether the data communication device 120-1 is associated with a second type of virtual private network service (e.g., a VPWS). In a similar way, data communication device 120-1 can set bits in other data fields 210 to indicate whether it is associated with any other types of VPN services as designated for a given data field 210.

According to one embodiment herein, message 200 is an FEC message transmitted through network 190 according to LDP (Label Distribution Protocol). An L2VPN (e.g., a layer 2 VPN) attribute TLV is added to an FEC message. The LDP "Forward and unknown bits" are set to allow the attribute TLV to be effectively broadcasted (e.g., at boot-up or other specified times when FEC messages are transmitted) along with the FEC message to other data communication devices 120 in the network 190. Consequently, a data communication device 120 receiving the message 200 can identify whether the data communication device sending a respective message 200 is associated with different types of respective VPN services by merely checking a setting of bits in respective data fields 210. As discussed, other data communication devices 120 can transmit a message 200 to other data communication devices in network 190.

Additional methods such as point-to-point communications (e.g., RSVP) can be used by a given data communication device to inform other data communication devices 120 whether the given data communication device in network 190 is VPLS-enabled, VPWS-enabled, etc.

In one embodiment, data field 220 includes a configuration version number. The configuration version number in data field 220 is an unsigned 8-bit integer that is incremented every time there is a significant change to the PE (Provider Edge) router provisioning information related to any of the VPN attributes. The determination of what constitutes a significant change can be a matter or local PE policy.

An example of a change that would cause the value of the configuration version number to be incremented or be set to a new value includes a situation in which a data communication device 120 in network 190 is added to or deleted from a particular VPLS. In such an instance, there is a change to provisioning information and the respective VPN service. Other data communication devices learn of such a change by checking whether the configuration version number in successive messages 200 is different or, more specifically, has been incremented since a last occurrence of receiving message 200. In one embodiment, the configuration version number is wrapped back to zero when it reaches a maximum value.

Distribution of message 200 prompts other data communication devices 120 to communicate with data communication device 120-1 for purposes of learning whether a data communication device 120-1 is VPLS-enabled, VPWS-enabled, etc. based on checking a setting of respective bits in data fields 210-1, data field 210-2, etc. of message 200.

In the present example shown in FIG. 2, data communication device 120-1 indicates sends a message 200 indicating that it is VPLS-enabled and, via use of data field 220, indicates (via a configuration version number as discussed above) that a data communication device 120-1 just booted up or there has been a change to provisioning information. Data communication devices 120 that receive message 200 check whether they are also "VPLS-enabled. If so, as is the case in this example because data field 210-1 is set to a logic hi, such data communication devices 120 receiving the message send out a request to data communication device 120-1 to learn of particular VPN identifiers associated with VPN services of the data communication device 120-1. In one embodiment, the querying data communication device(s) 120 utilize a query-response LDP protocol to retrieve a respective list of VPNs associated with data communication device 120-1. A different protocol other than LDP can be used for stage 2 of the auto-discovery technique herein.

In the example as shown in FIG. 1, data communication device 120-2 and data communication device 120-4 are VPLS-enabled because each data communication device supports at least one VPLS. Assume that data communication device 120-3 is not VPLS-enabled. In this case, since data communication device 120-3 is not VPLS-enabled, data communication device 120-3 would not send a query to data communication device 120-1 for a list of VPLS VPNs in response to receiving message 200 because it is not configures to support any VPLSs. Configuring data communication device 120-3 not to query data communication device 120-1 in this case reduces network congestion in network 190 that would otherwise result if data communication device 120-3 (as well as other non VPLS-enabled data communication devices) needlessly were to query data communication device 120-1 for a listing of VPN information. Thus, according to one embodiment herein, a data communication device 120 distributing message 200 that it is VPLS-enabled does not receive a request for a list of associated VPNs from a respective data communication device 120 receiving message 200 unless the respective data communication device is also VPLS-enabled.

Figure 3:
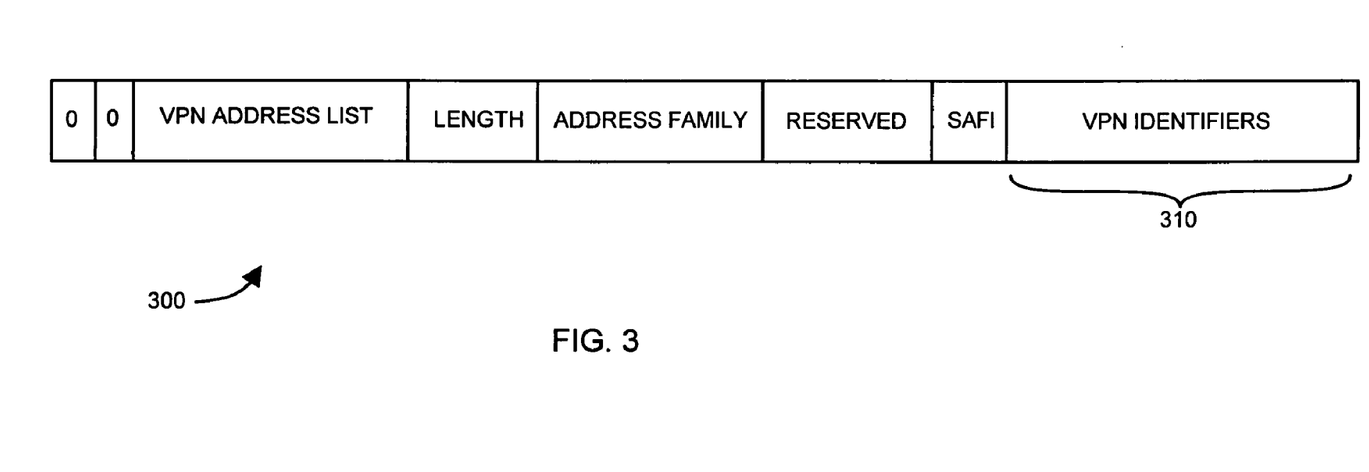
FIG. 3 is a diagram illustrating contents of a message including a listing of VPNs associated with a router in a network according to an embodiment herein.

Since both data communication device 120-2 and data communication device 120-4 are VPLS-enabled, both data communication devices 120-1 and 120-2 receiving message 200 would send respective queries to data communication device 120-1 for the list. In response to receiving respective queries, data communication device 120-1 sends a list of VPN identifiers to the querying data communication devices 120 via a message 300 as shown in FIG. 3. For example, data communication device 120-1 generates message 300 to include a listing of VPN identifiers in data field 310. In one embodiment, the VPN identifiers are 32 bit addresses identify respective VPLS VPNs associated with data communication device 120-1. Thus, other data communication devices 120 in network 190 discover whether the data communication device 120-1 initiates distribution of message 200 is associated with a VPLS.

Accordingly, based on the aforementioned technique, receipt of message 200 including a bit set to indicate that data communication device 120-1 is VPLS-enabled informs one or more remote data communication devices 120 to initiate stage 2 of the auto-discovery process and fetch the list of VPN IDs. As mentioned, the LDP protocol includes an Address Message that can be used by LSRs to advertise the locally connected interface IP addresses. The LDP address Message includes the address TLV, and an optional parameters field. According to one embodiment, to discover the VPN ID of the VPLS VPNs used in a particular data communication device 120, the data communication device 120 advertises the list of locally used VPN IDs according to LDP as well as the procedures specified in section 3.5.5 of Request For Comment 3036 (e.g., RFC3036). This "address" message 300 as discussed above can include the VPN Address List TLV as an optional parameter.

According to one embodiment, an LSR (Label Switching Router) in network 190 will only include the VPN Address List TLV as an optional parameter if the following conditions are met:

i. The remote LDP identifier of the remote LDP speaker matched a previously discovered PE with the L2VPN attribute set.

ii. The remote host LDP interface address list contains an IP address of a previously discovered PE with the L2VPN attribute set.

All the normal LDP address procedures indicated in [RFC3036] section 3.5.5 apply to a new VPN Address List TLV including the address withdraw procedure.

After retrieving a list of VPN identifiers associated with data communication device 120-1, a respective data communication device 120 receiving the VPN addresses can initiate further communications with a data communication device 120-1 to set up a VPN service. For example, after data communication device 120-2 compares the list of VPN identifiers retrieved from data communication device 120-1 with its own set of VPN identifiers, data communication device 120-2 can identify whether it is associated with one or more of the same VPNs. If so, the data communication device communicates with data communication device 120-1 to set up a respective VPN service (e.g., VPLS-A and VPLS-B) between data communication device 120-1 and data communication device 120-2.

In one embodiment, the data communication devices communicate with each other to set up a single VPN or pseudo-wire to support secure communications between network 150-1 and network 150-3 via VPLS-A. The data communication devices also communicate with each other to set up a separate VPN or pseudo-wire to support secure communications between network 150-2 and network 150-4 via VPLS-B.

In an alternate embodiment, the data communication devices communicate to set up a single pseudo wire that is split into two separate channels. A first channel of the pseudo wire supports secure communications between network 150-1 and network 150-3 to form VPLS-A while a second channel of the pseudo-wire supports secure communications between network 150-2 and network 150-4 to form VPLS-B.

The above-mentioned two-step approach to VPLS discovery enables a service provider associated with network 190 to use only a single protocol (such as the LDP protocol) to support and manage VPLS in the instances where the network providing the VPLS service does not use BGP for any other services. Additionally, techniques herein enhance scalability because VPLS VPN identifier information is not propagated to all VPLS routers at once. This reduces network congestion. Furthermore, techniques herein provide increased flexibility because, if so desired, a first protocol can be used to notify other members whether a given data communication device 120 in network 190 is associated with a VPLS while a second protocol such as E-GVRP can be used to perform step of the discovery process. Possible techniques for using E-GVRP in the second stage can be found in related application entitled "A Comprehensive Model for VPLS," U.S. patent application Ser. No. 11/117,250 filed on Apr. 28, 2005.

Figure 4:
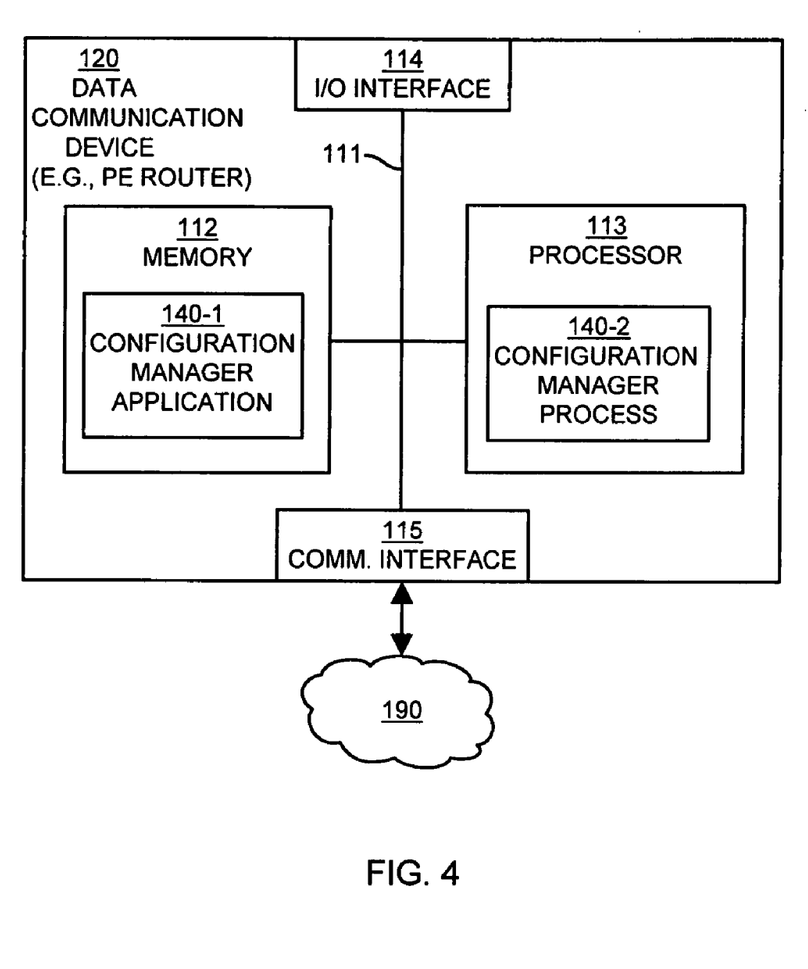
FIG. 4 is a block diagram of a processing device suitable for executing an auto-discovery technique according to an embodiment herein.

FIG. 4 is a block diagram illustrating an example architecture of a data communication device 120 (e.g., a PE router in network 190 of FIG. 1) for executing a configuration manager application 140-1 according to embodiments herein. According to one embodiment as discussed above, configuration manager application 140-1 facilitates the configuration of network 190 with VPN services.

Data communication device 120 may be a computerized device such as a personal computer, workstation, portable computing device, console, network terminal, processing device, router, server, etc. As shown, data communication device 120 of the present example includes an interconnect 111 that couples a memory system 112, a processor 113, I/O interface 114, and a communications interface 115. I/O interface 114 potentially provides connectivity to optional peripheral devices such as a keyboard, mouse, display screens, etc.

Communications interface 115 enables data communication device 120 to communicate over network 190 to other data communication devices in communication system 100.

As shown, memory system 112 is encoded with a configuration manager application 140-1 (e.g., configuration manager 135 as in FIG. 1) supporting discovery and implementation of VPN services in an MPLS network as discussed above. Configuration manager application 140-1 may be embodied as software code such as data and/or logic instructions (e.g., code stored in the memory or on another computer readable medium such as a disk) that supports processing functionality according to different embodiments described herein. During operation, processor 113 accesses memory system 112 via the interconnect 111 in order to launch, run, execute, interpret or otherwise perform the logic instructions of the configuration manager application 140-1. Execution of the configuration manager application 140-1 produces processing functionality in configuration manager process 140-2. In other words, the configuration manager process 140-2 represents one or more portions of the configuration manager application 140-1 (or the entire application) performing within or upon the processor 113 in the data communication device 120.

It should be noted that a configuration manager 135 executed in a data communication device 120 (as in FIG. 1) can be represented by either one or both of the configuration manager application 140-1 and/or the configuration manager process 140-2. For purposes of the discussion of the operation of embodiments of the present application, general reference will be made to data communication device 120 or respective configuration manager 135 as performing or supporting the various steps and functional operations to carry out the features of embodiments herein.

It also should be noted that, in addition to the configuration manager process 140-2, embodiments herein include the configuration manager application 140-1 itself (i.e., the un-executed or non-performing logic instructions and/or data). The configuration manager application 140-1 may be stored on a computer readable medium such as a floppy disk, hard disk or in an optical medium. The configuration manager application 140-1 may also be stored in a memory type system such as in firmware, read only memory (ROM), or, as in this example, as executable code within the memory system 112 (e.g., within Random Access Memory or RAM). In addition to these embodiments, it should also be noted that other embodiments herein include the execution of configuration manager application 140-1 in processor 113 as the configuration manager process 140-2. Thus, those skilled in the art will understand that the data communication device 120 (e.g., computer system) can include other processes and/or software and hardware components, such as an operating system that controls allocation and use of hardware resources.

Functionality supported by data communication device 120 and, more particularly, configuration manager 135 will now be discussed via flowcharts in FIG. 5-7. For purposes of this discussion, data communication device 120 such as a PE router in network 190 or a respective configuration manager 135 generally performs steps in the flowcharts. This functionality can be extended to the other entities as well. Note that there will be some overlap with respect to concepts discussed above for FIGS. 1 through 3. Also, note that the steps in the below flowcharts need not always be executed in the order shown.

Figure 5:
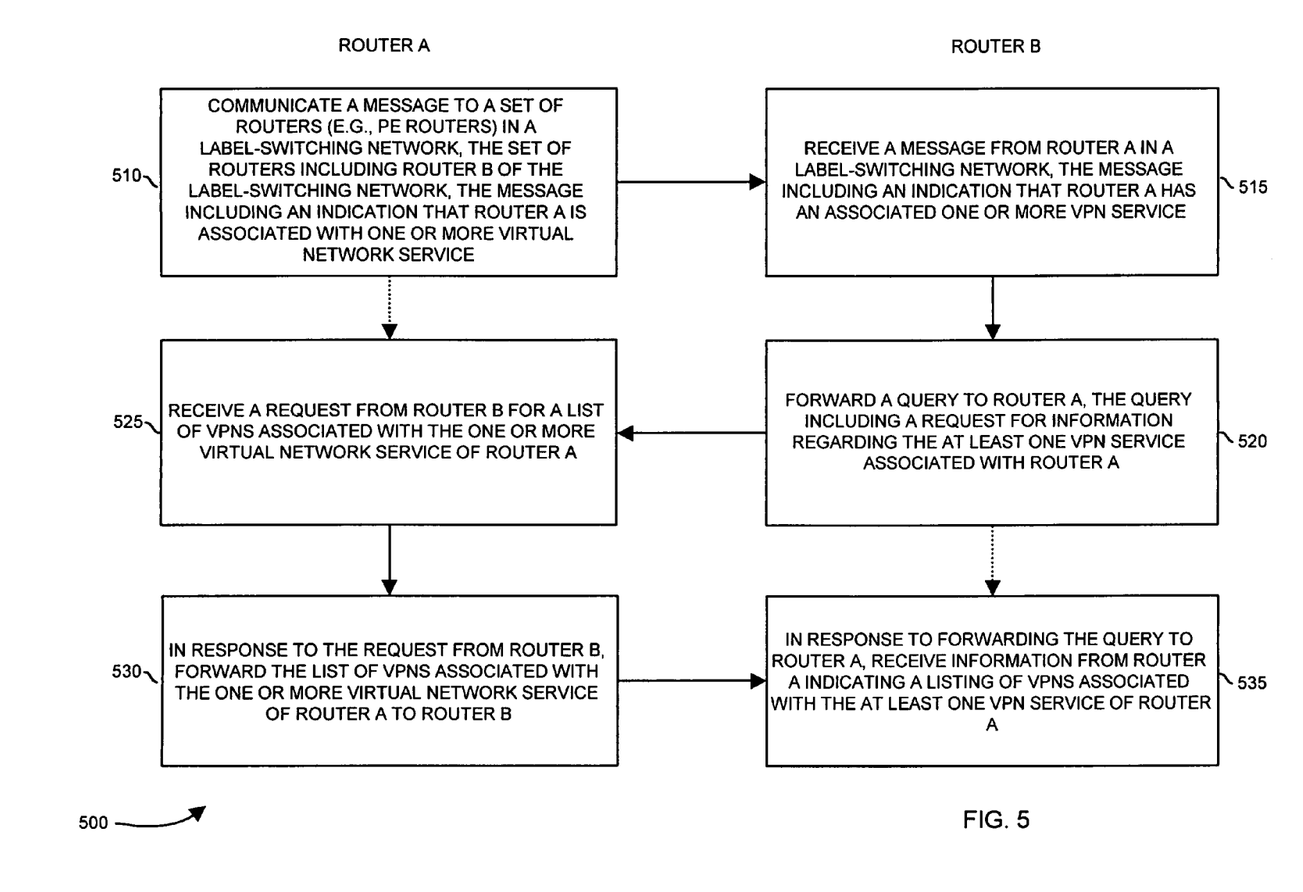
FIG. 5 is a flowchart illustrating a technique for setting up a VPN service amongst two or more routers according to an embodiment herein.

FIG. 5 is a flowchart 500 illustrating a technique of notifying other data communication devices that a given data communication device such as a PE router is associated with a virtual private network service. As discussed, one purpose of distributing the notification is to initiate auto-discovery for setting up a VPLS in an MPLS network. Of course, the following examples discuss use of "router A" and "router B" to discuss embodiments herein. However, the functionality supported by router A and router B, as discussed below in the following flowcharts, can be implemented by other types of data communication devices.

The following flowchart 500 illustrates an example of how a first data communication device such as router A communicates with a second data communication device such as router B in network 190 to set up a VPN service such as a VPLS, VPWS, etc. This routine in flowchart 500 can be extended to support simultaneous auto-discovery and setup of a VPN service amongst three or more PE routers as well.

In step 510, router A communicates (e.g., initiates distribution of) a message 200 to a routers (e.g., PE routers) in label-switching network 190. The set of routers (e.g., entities labeled as data communication devices 120 in FIG. 1) to which router A sends the message 200 includes router B. The message sent by router A includes an indication that router A is associated with one or more virtual network service. In other words, certain bits are set in the message 200 to indicate that router A belongs to a VPN service. The message 200 need not specifically indicate which VPN service to which the router belongs.

In step 515, router B receives the message 200 from router A indicating that router A has an associated or is associated with one or more VPN services.

In step 520, router B forwards a query to router A. The query includes a request for information (e.g., a list of VPNs) associated with router A.

In step 525, router A receives the request from router B for the list of VPNs associated with the one or more VPN services to which router A belongs.

In step 530, in response to the request from router B, router A forwards the list of VPNs (e.g., via message 300) associated with the one or more VPN services associated with router A to router B.

In step 535, router B receives information (e.g., the listing of VPNs) from router A indicating VPNs associated with the at least one VPN service of router A. Based on further communications, router A and router B can setup a respective VPLS without unnecessary communications with other data communication devices 120 in network 190 that do not support the VPLS.

Note that although the above discussion pertains to a specific data communication device (e.g., router A and router B in a label-switching network) such as data communication device 120-1 and data communication device 120-2, each of the other data communication devices 120 of network 190 can operate in a similar way to initiate auto-discovery and configuration of the same or different VPLSs in network 190.

Figure 6:
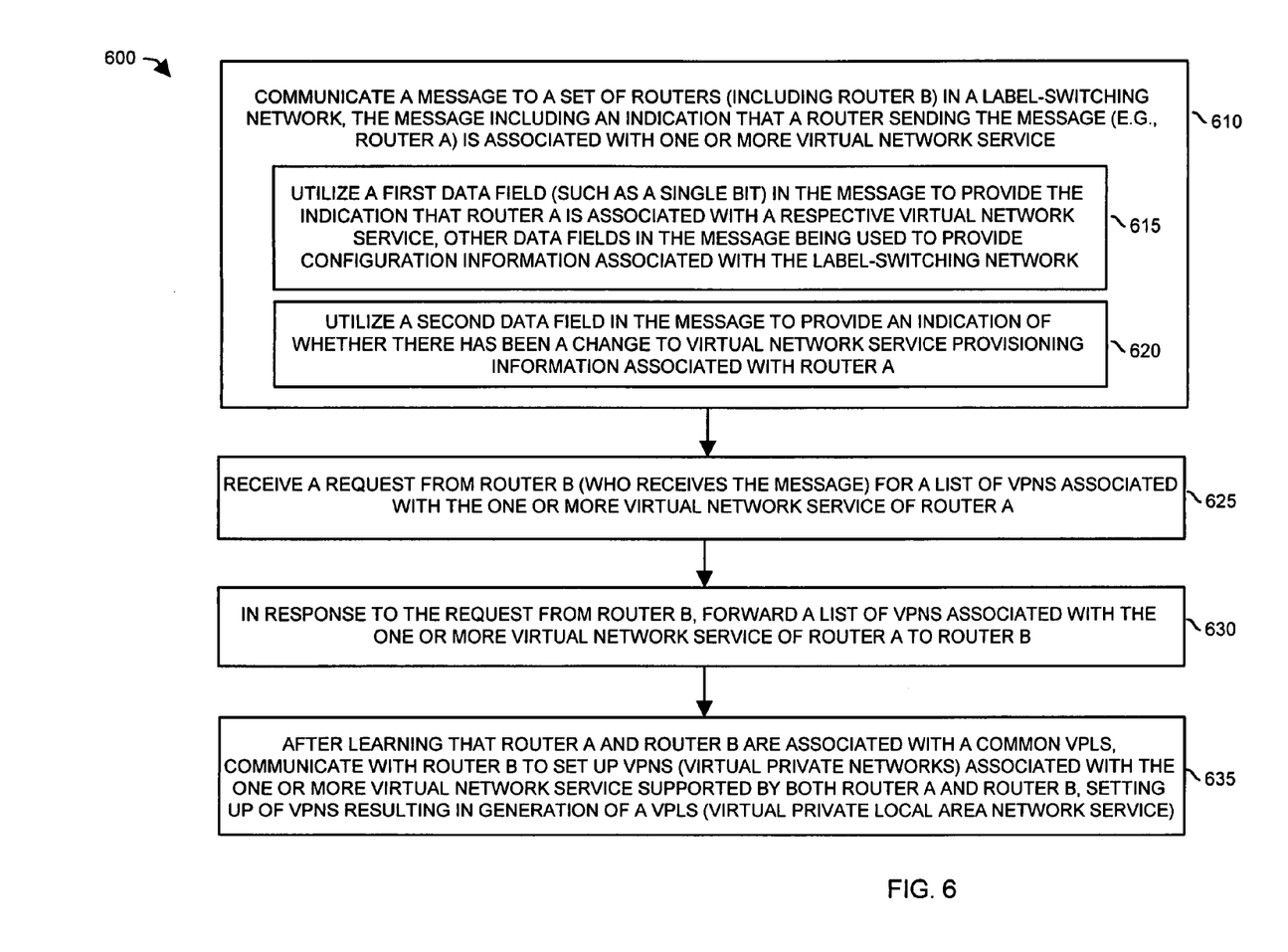
FIG. 6 is a flowchart illustrating a more specific technique supporting auto-discovery and implementation of VPN services according to an embodiment herein.

FIG. 6 is a flowchart 600 illustrating more specific techniques for configuring a network from the perspective of router A (e.g., a router that distributes an indication that it is associated with at least one VPLS as in the above example) according to further embodiments herein.

In step 610, router A of network 190 communicates a message 200 to a set of routers (including router B) in a label-switching network 190. The message 200 includes an indication that router A is associated with one or more VPN services.

In sub-step 615 of step 610, router A utilizes data field 210 (such as a single bit) in the message 200 to provide the indication that router A is associated with a respective type of VPN service. Other data fields in the message are used to distribute configuration information associated with a respective label-switching network such as discussed below in sub-step 620. In one embodiment, the message 200 is an FEC message that is distributed in network 190 via LDP. As discussed above, the information indicating whether a router VPLS-enabled is "piggybacked" onto the FEC message sent via LDP.

In sub-step 620 of step 610, router A utilizes data field 220 in the message 200 to provide an indication of whether there has been a change to virtual network service provisioning information associated with router A. As mentioned, changes to virtual network service provisioning information occur when router A is added or deleted from a respective VPLS. As discussed, according to one embodiment, router A can increment the value in the data field 220 by one form a previous message transmission in order to indicate a change to VPN provisioning information. A router receiving a periodic message of this type can therefore identify when a change occurs by comparing a value of a last received configuration version number to a newly received configuration version number in message 200.

In step 625, router A receives a request from router B for a list of VPNs associated with the one or more virtual network service of router A.

In step 630, in response to the request from router B, router A forwards (to router B) a list of VPNs associated with the one or more virtual network service of router A.

In step 635, after learning that router A and router B are associated with a common VPLS, router A communicates with router B to set up respective VPNs associated with the one or more virtual network service supported by both router A and router B. Setting up the VPNs in the network results in instantiation of a VPLS (Virtual Private Local area network Service).

Figure 7:
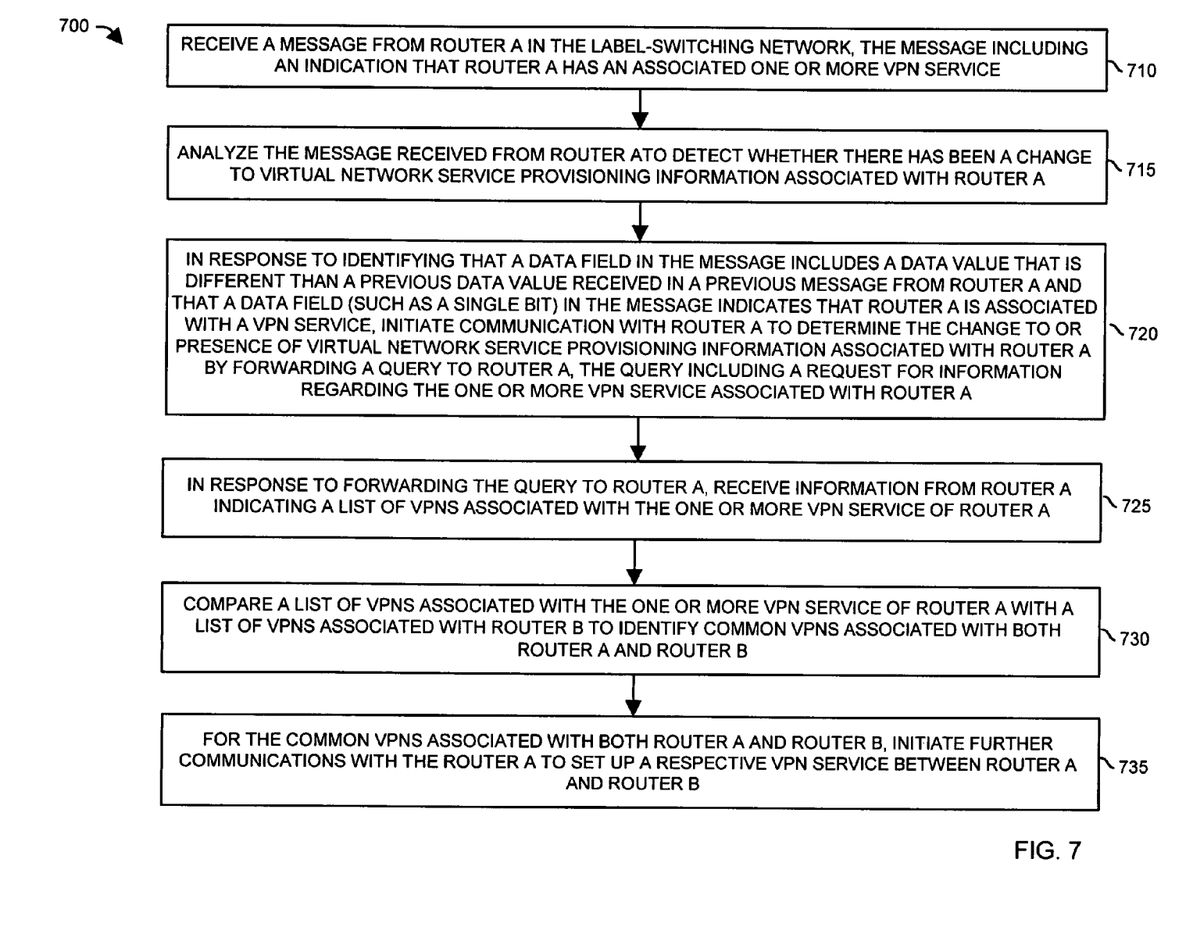
FIG. 7 is a flowchart illustrating a more specific technique supporting auto-discovery and implementation of VPN services according to an embodiment herein.

FIG. 7 is a flowchart 700 illustrating more specific techniques for configuring a network from the perspective of router B (e.g., a PE router that receives an indication that another router in network 190 is associated with at least one VPLS) according to further embodiments herein.

In step 710, router B receives a message 200 from router A. The message 200 includes an indication that router A is associated with or has an associated one or more VPN services.

In step 715, router B analyzes the message 200 received from router A to detect whether there has been a change to virtual network service provisioning information associated with router A by checking a configuration version number in the message 200.

In step 720, in response to identifying that a data field 220 in the message 200 includes a data value (e.g., a configuration version number) that is different than a previous data value received in a previous message 200 from router A and that data field 210 (such as a single bit) in the message 200 indicates that router A is associated with a VPN service, router B initiates communication with router A to determine the virtual network service provisioning information (e.g., a list of VPN addresses) associated with router A by forwarding a query to router A. The query includes a request for information regarding one or more VPN services associated with router A.

In step 725, in response to forwarding the query to router A, router B receives information (e.g., message 300) from router A indicating a list of VPNs associated with the one or more VPN service of router A.

In step 730, router B compares a list of VPNs associated with the one or more VPN service of router A with a list of VPNs associated with router B to identify common VPNs associated with both router A and router B.

In step 735, for the common VPNs associated with both router A and router B, router B initiates further communications with the router A to set up a respective VPN service between router A and router B.

Note again that techniques herein are well suited for use in applications such as configuring a network to support a VPLS in a label-switching network. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a first data communication device of a label-switching network, a method to facilitate configuring the label-switching network with VPN (Virtual Private Network) services, the method comprising:
   discovering at the first data communication device which ones of a plurality of data communication devices in the label-switching network are associated with a Virtual Private Network in common with the first data communication device by:
       communicating a message from the first data communication device to a set of the data communication devices in the label-switching network, the set of the data communication devices including a second data communication device in the label-switching network, the message including an indication that the first data communication device supports at least one VPN service without including a list of Virtual Private Networks (VPNs) associated with the at least one VPN service of the first data communication device;
       receiving, at the first data communication device, a request from the second data communication device for the list of VPNs associated with the at least one VPN service of the first data communication device;
       in response to the request from the second data communication device, forwarding, from the first data communication device to the second data communication device, the list of VPNs associated with the at least one VPN service of the first data communication device; and
       receiving from the second data communication device an identifier of the Virtual Private Network common to both the first data communication device and the second data communication device; and
   setting up a respective VPN service between the first data communication device and the second data communication device, the respective VPN service corresponding to the Virtual Private Network discovered to be common to both, the first data communication device and the second data communication device.

2. A method as in claim 1, wherein communicating the message to the set of the data communication devices in the label-switching network includes:
   utilizing a first data field in the message to provide the indication that the first data communication device supports the at least one VPN service; and
   utilizing a second data fields in the message to provide configuration information associated with the label-switching network.

3. A method as in claim 2, wherein communicating the message to the set of the data communication devices in the label-switching network further includes utilizing a third data field in the message to provide an indication of whether there has been a change to virtual private network service provisioning information associated with the first data communication device.

4. A method as in claim 3, wherein communicating the message to the set of the data communication devices in the label-switching network includes:
   generating an FEC (Forward Equivalency Class) message to include a network layer 2 VPN attribute in a data field of the FEC message, a single bit in the data field indicating whether the first data communication device supports the at least one VPN service; and
   forwarding the FEC message to the set of the data communication devices in the label-switching network.

5. A method as in claim 1, wherein communicating the message to the set of the data communication devices in the label-switching network includes:
   utilizing a first data field in the message to indicate whether the first data communication device is associated with a first type of virtual private network service; and
   utilizing a second data field in the message to indicate whether the first data communication device is associated with a second type of virtual private network service.

6. A method as in claim 1 further comprising communicating with the second data communication device to set up VPNs (Virtual Private Networks) associated with the respective VPN Service, the VPNs supported by both the first data communication device and the second data communication device, the setting up of the respective VPN service resulting in generation of a VPLS (Virtual Private Local area network Service).

7. A method as in claim 1 further comprising:
   utilizing a first communication protocol to communicate the message to the set of the data communication devices; and
   utilizing a second communication protocol to forward the list of VPNs associated with the at least one VPN service of the first data communication device to the second data communication device.

8. A method as in claim 1, wherein the first data communication device is VPLS-enabled (Virtual Private Local area network Service-enabled), and wherein receiving the request from the second data communication device for the list of VPNs is contingent upon the second data communication device also being VPLS-enabled.

9. A method as in claim 1, the method further comprising:
   receiving a corresponding request from a third data communication device for the list of VPNs associated with the at least one VPN service of the first data communication device, the third data communication device included in the set of the data communication devices; and
   in response to receiving the corresponding rdquest from the third data communication device, forwarding the list of VPNs associated with the at least one VPN service of the first data communication device to the third data communication device.

10. A method as in claim 1, wherein communicating the message includes utilizing a single bit in the message to provide the indication that the first data communication device supports the at least one VPN service.

11. A method as in claim 1, wherein setting up the respective VPN service occurs after receiving the request from the second data communication device for the list of VPNs.

12. In a first router of a label-switching network, a method to facilitate configuring the label-switching network with a VPN (virtual Private Network) service, the method comprising:

discovering at the first router which ones of a plurality of routers in the label-switching network are associated with a Virtual Private Network in common with the first router by:

receiving a message from a second router in the label-switching network, the message including an indication that the second router supports at least one VPN service;

forwarding a query to the second router based on prior receipt of the message, the query including a request for information regarding the at least one VPN service associated with the second router;

in response to forwarding the query to the second router, receiving information from the second router indicating Virtual Private Networks (VPNs) associated with the at least one VPN service of the second router; and     setting up the respective VPN Service between the first router and the second router, the respective VPN service corresponding to the Virtual Private Network common to both the first router and the second router.

13. A method as in claim 12 further comprising:

comparing a list of VPNs associated with the at least one VPN service of the second router with a list of VPNs associated with the first router to identify common VPNs associated with both the first router and the second router; and for the common VPNs associated with both the first router and the second router, initiating further communications with the second router to set up the respective VPN service between the first router and second router.

14. A method as in claim 12 further comprising analyzing a second message received from the second router to detect whether there has been a change to virtual private network service provisioning information associated with the second router.

15. A method as in claim 14, wherein analyzing the message includes, in response to determining a data field in the message includes a data value that is different than a previous data value received in a previous message from the second router, initiating communication with the second router to determine the change to virtual private network service provisioning information associated with the second router.

16. A method as in claim 12 further comprising setting up the respective VPN service between the first data communication device and the second data communication device after receiving the information from the second router indicating the VPNs associated with the at least one VPN service of the second router.

17. A computer system for implementing VPN (Virtual Private Network) services in a label-switching network, the computer system comprising:

a processor;

a memory unit that stores instructions associated with an application executed by the processor; and     an interconnect coupling the processor and the memory unit, enabling the computer system to execute the application and perform operations of:

discovering which ones of a plurality of routers in the label-switching network are associated with a Virtual Private Network that is also associated with a first router by:

communicating a message to a set of the routers in the label-switching network, the set of the routers including a second router in the label-switching network, the message including an indication that the first router supports at least one VPN service without including a list of Virtual Private Networks (VPNs) associated with the at least one VPN service of the first router;

receiving a request from the second router for the list of VPNs associated with the at least one VPN service of the first router;

in response to the request from the second router, forwarding the list: of VPNs associated with the at least one VPN service of the first router to the second router; and             receiving from the second router an identifier of the Virtual Private Network common to both the first router and the second router; and         setting up a respective VPN service between the first router and the second router in response to receiving the identifier of the Virtual Private Network, wherein the respective VPN service is included in the at least one VPN services.

18. A computer system as in claim 17, wherein communicating the message to the set of the routers in the label-switching network includes utilizing a first data field in the message to provide the indication that the first router is associated with the at least one VPN service, other data fields in the message being used to provide configuration information associated with the label-switching network.

19. A computer system as in claim 18, wherein communicating the message to the set of the routers in the label-switching network further includes utilizing a second data field in the message to provide an indication of whether there has been a change to virtual private network service provisioning information associated with the first router.

20. A computer system as in claim 19, wherein communicating the message to the set of the routers in the label-switching network includes generating an FEC (Forward Equivalency Class) message to include a network layer 2 VPN attribute in a data field of the FEC message, a single bit in the data field indicating whether the first router is associated with the at least one VPN service; and forwarding the FEC message to the set of the routers in the label-switching network.

21. A computer system as in claim 17, wherein communicating the message to the set of the routers in the label-switching network includes:

utilizing a first data field in the message to indicate whether the first router is associated with a first type of virtual private network service; and     utilizing a second data field in the message to indicate whether the first router is associated with a second type of virtual private network service.

22. A computer system as in claim 17, wherein setting up the respective VPN service includes generating a VPLS (Virtual Private Local area network Service).

23. A computer system as in claim 17 further supporting operations of:

utilizing a first communication protocol to communicate the message to the set of the routers; and     utilizing a second communication protocol to forward the list of VPNs associated with the at least one VPN service of the first router to the second router.

24. A computer system as in claim 17, wherein the first router is VPLS-enabled (Virtual Private Local area network Service—enabled), and wherein receiving the request from the second router for the list of VPNs is contingent upon the second router also being VPLS-enabled.

25. A computer system as in claim 17, further supporting operations of:
  receiving a corresponding request from a third router for the list of VPNs associated with the at least one VPN service of the first router, the third router included in the set of the routers; and
  in response to receiving the corresponding request from the third router, forwarding the list of VPNs associated with the at least one VPN service of the first router to the third router.

26. A computer system as in claim 25, wherein communicating the message includes utilizing a single bit in the message to provide the indication that the first router is associated with the at least one VPN service.

27. A computer system as in claim 17, wherein setting up the respective VPN service occurs after communicating the message.

28. A computer system for implementing VPN (Virtual Private Network) services in a label-switching network, the computer system comprising:
  a processor;
  a memory unit that stores instructions associated with an application executable with the processor; and
  an interconnect coupling the processor and the memory unit, enabling the computer system to execute the application and perform operations of:
  discovering which ones of a plurality of routers in the label-switching network are associated with a Virtual Private Network that is also associated with a first router by:
  receiving a message from a second router in the label-switching network, the message including an indication that the second router supports at least one VPN service without identifying Virtual Private Networks (VPNs) associated with the at least one VPN service of second router;
  forwarding a query to the second router based on receipt of the message from the second router, the query including a request for information regarding the at least one VPN service associated with the second router;
  in response to forwarding the query to the second router, receiving information from the second router identifying the VPNs associated with the at least one VPN service of the second router;
  comparing the list of VPNs associated with the at least one VPN service of the second router with a list of VPNs associated with the first router to identify common VPNs associated with both the first router and the second router; and
  for the common VPNs, initiating further communications with the second router to set up a respective VPN service.

29. A computer system as in claim 28 further supporting operations of analyzing a second message received from the second router to detect whether there has been a change to virtual private network service provisioning information associated with the second router.

30. A computer system as in claim 29, wherein analyzing the second message includes, in response to determining a data field in the message includes a data value that is different than a previous data value received in a previous message from the second router, initiating communication with the second router to determine the change to virtual private network service provisioning information associated with the second router.

31. A label-switching network system comprising:
  a first data communication device in a label-switching network;
  a plurality of other data communication devices in the label-switching network; and the first data communication device supporting operations of: discovering at the first data communication device which ones of the plurality of other data communication devices are associated with a Virtual Private Network that is also associated with the first data communication device by:
  communicating a message to the plurality of other data communication devices in the label-switching network, the plurality of other data communication devices including a second data communication device, the message including an indication that the first data communication device is configured to support at least one VPN service without including a list of Virtual Private Networks (VPNs) associated with the at least one VPN service of the first data communication device;
  receiving a request from the second data; communication device at: the first data communication device for the list of the VPNs associated with the at least one VPN Service of the first data communication device;
  in response to the request from the second data communication device, forwarding the list of VPNs associated with the at least one, VPN service of the first data communication device to the second data communication device from the first communication device; and
  receiving from the second data communication device an identifier of the Virtual Private Network common to both the first data communication device and the second data communication device; and
  setting up a respective VPN service between the first data communication device and the second data communication device, wherein the respective VPN service is included in the at least one VPN services and the respective VPN service corresponds to the Virtual Private Network discovered to be common to both the first data communication device and the second data communication device.

32. A computer-readable storage medium comprising computer executable instructions, wherein the computer executable instructions, when executed by a processor, are executable to:
  discover at a first data communication device which ones of a plurality of other data communication devices in the Label-switching network are associated with a Virtual Private Network that is also associated with the first data communication device, wherein the computer executable instructions executable to discover which ones of the data communication devices are associated with the Virtual Private Network are further executable to:
  communicate a message from the first data communication device in a label-switching network to a set of the other data communication devices in the label-switching network, wherein the set of the other data communication devices includes a second data communication device, and the message includes an indication that the first data communication device is configured to implement at least one VPN service;
  receive a request from the second data communication device for a list of Virtual Private Networks (VPNs) associated with the at least one VPN service in the first data communication device;

in response to the request from the second data communication device, forward the list of VPNs associated with the at least one VPN service in the first data communication device to the second data communication device; and receive identification of the Virtual Private Network in common with both the first data communication device and second data communication device from the second data communication device; and set up a respective VPN service between the first data communication device and the second data communication device, wherein the VPN service is included in the at least one VPN services and the respective VPN service corresponds to the Virtual Private Network discovered to be common to both the first data communication device and the second data communication device.

33. A computer system to configure VPN (Virtual Private Network) services in a label-switching network, the computer system comprising:

a processor;

a memory, wherein executable instructions are embodied in the memory; and an interconnect, wherein the processor is coupled to the memory and the executable instructions are executable to:

discover which ones of a plurality of routers in the label-switching network are associated with a Virtual Private Network that is also associated with a first router, wherein the instructions executable to discover which ones of the routers are associated with the Virtual Private Network are executable to:

receive a message from a second router in the label-switching network, wherein the message includes an indication that the second router supports at least one VPN service;

forward a query to the second router based on receipt of the message from the second router, wherein the query includes a request for information about the at least one VPN service associated with the second router; and receive information from the second router in response to the query, where the information identifies virtual Private Networks associated with the at least one VPN service of the second router; and set up a respective VPN service amongst the computer system and the second router based on the information received from the second router in response to the query.

* * * * *

UNITED STATES PATENT AND TRADEMARK OFFICE
CERTIFICATE OF CORRECTION

| | | |
|---|---|---|
| PATENT NO. | : 7,668,178 B2 | Page 1 of 1 |
| APPLICATION NO. | : 11/214521 | |
| DATED | : February 23, 2010 | |
| INVENTOR(S) | : Martini et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1186 days.

Signed and Sealed this

Twenty-eighth Day of December, 2010

David J. Kappos
*Director of the United States Patent and Trademark Office*